W. E. BROCK.
Compound Lumber.
No. 230,174. Patented July 20, 1880.
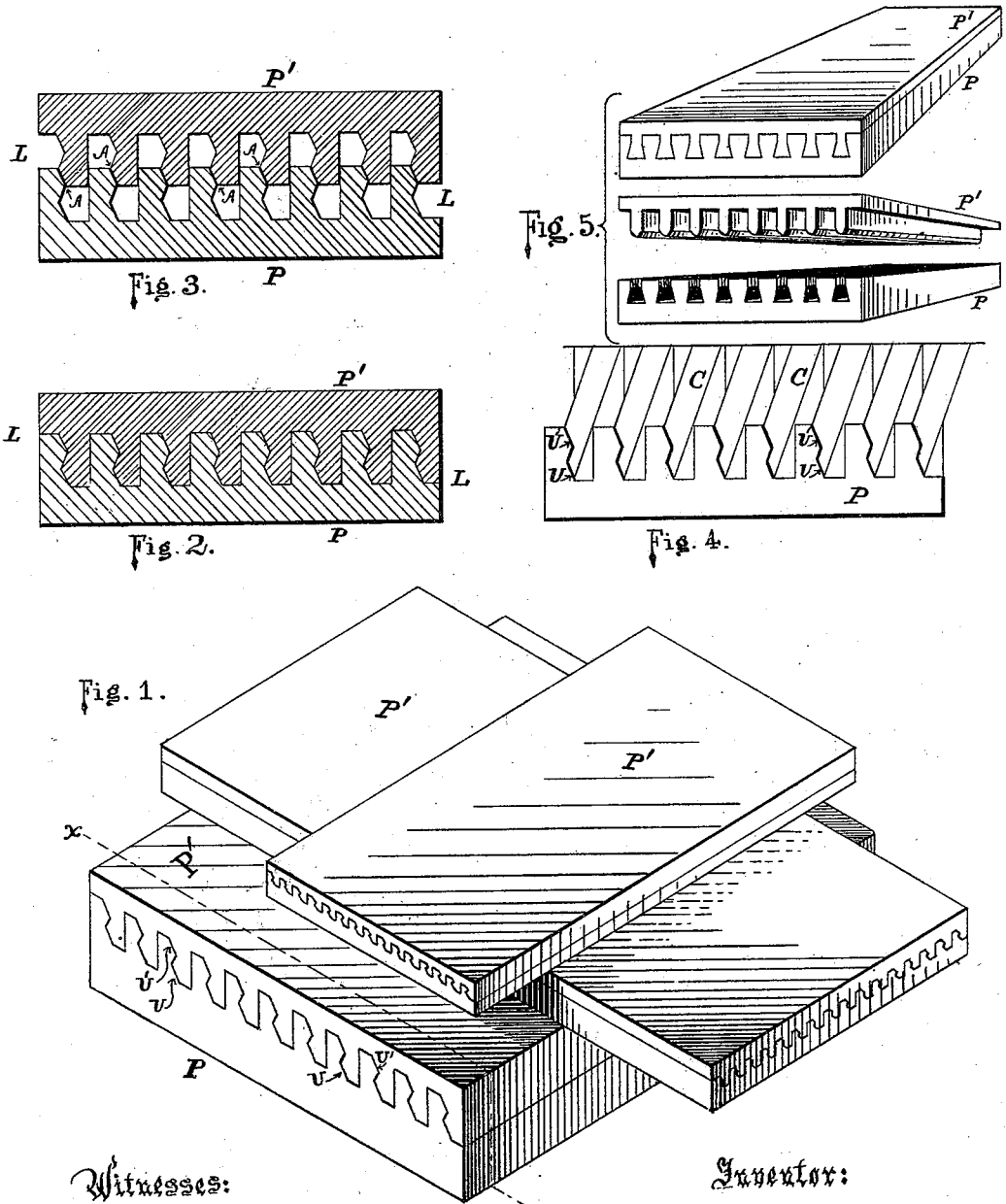
Witnesses:
George A. Hammel
Edward E. Woolley
Inventor:
William E. Brock

UNITED STATES PATENT OFFICE.

WILLIAM E. BROCK, OF NEW YORK, N. Y., ASSIGNOR TO THE COMPOUND LUMBER COMPANY.

COMPOUND LUMBER.

SPECIFICATION forming part of Letters Patent No. 230,174, dated July 20, 1880.

Application filed February 26, 1880.

*To all whom it may concern:*

Be it known that I, WILLIAM EDWARD BROCK, of No. 1080 Second avenue, in the city, county, and State of New York, have invented a new and useful Improvement in Compound Lumber and in the Method of Forming the Same, of which the following is a specification.

The invention relates to lumber composed of two or more layers or thicknesses of wood provided with fine ribs or tongues and grooves on their inner surfaces, which are placed face to face and made to engage by lateral insertion under pressure, as in the Letters Patent No. 183,042, granted to Daniel M. Cummings, October 10, 1876, and No. 206,534, granted to myself and Jane Thompson, July 30, 1878.

In the former of these Letters Patent the tongues and grooves were made to have parallel sides, the former being made enough larger than the latter to enter therein with sufficient friction to bind the two parts together, and in the latter the tongues and grooves, made with parallel sides, were made by tools, which formed the same by compression from the material of the entire surface operated upon.

The object of this invention is to make compound lumber the layers of which shall have ribs or tongues and grooves with other than parallel sides, in whole or in part, to be put together by lateral insertion, as distinguished from endwise insertion, of the ribs or tongues into the grooves, and held together by locking-joints.

The invention consists in compound lumber the inner and adjacent surfaces of the layers of which are provided with coinciding ribs or tongues and grooves and held together by locking-joints engaged by lateral pressure of the layers of wood.

It also consists in the improvement in the art of making the same.

In the accompanying drawings, in which similar letters represent similar parts, Figure 1 is a perspective view of the complete lumber; Fig. 2, a vertical cross-section on line *x x*, Fig. 1; Fig. 3, a view showing the parts placed together and engaged previous to being pressed together, and Fig. 4 a view of the tool for undercutting to make the shoulder of a locking-joint. Fig. 5 shows dovetail tongues and grooves engaged by lateral insertion and shape of the parts before lateral insertion.

L L are the locking-joints, and are best produced by first cutting parallel tongues and grooves, as in the invention of Cummings, previously cited, and subsequently undercutting on a lower portion of one side, U U, of each by means of a tool or cutter, C C, Fig. 4, or in any known way. At the same time, by the same tool, with a surface therefor, or at any other period, and by a separate tool, the upper part of the tongues on one common side of all may be cut or grooved away at U' U', so that when the two faces of the parts P P' are placed together the tongues will each enter their respective coinciding grooves or counterparts in the opposite part for a short distance, as shown in Fig. 3. The parts P P' being so placed and pressure being applied by means of rollers, between which they are made to pass, or in any other way, the wood at the projecting angle A A will be wedged or compressed sidewise, so as to allow of complete engagement, as shown in Figs. 1 and 2. In this operation the angles A A of the tongues of the part composed of the softest wood will doubtless yield the most, and permit the corresponding angle of the harder wood to pass by, and under the effect of continued pressure the tongues and grooves will reach or approximate the relations shown in Figs. 1 and 2, wherein the two opposite angles A A of the opposite parts form a locking-joint with each other and prevent separation of the parts. In this operation the compressing force is developed both vertically and laterally at the angles A A in each part.

I contemplate, also, the reproducing of the under-cut U and angle A on the opposite sides of the tongue and groove, if desired; but I do not consider it necessary to the holding of the parts together.

I also contemplate the formation of compound lumber having on one or both sides of the tongues and grooves the bottoms of same undercut and the tops left straight to a greater or lesser extent, into which the edges of the corresponding straight tongues, deeper than the grooves, may be compressed, so as to fill the grooves and form locking-joints, as in Fig. 5. Such a joint and method of producing the same I consider form locking-joints which are the equivalents of the joint and method hereinbefore described. In this case, however, the compression is chiefly vertical, and the lateral compression, which may change the form of the tongue, is mainly confined to the straight-sided tongues.

The parts P P' may be composed, of course, of woods of different kinds and colors. More than two layers of wood may be compounded together in a similar manner If it be desired or necessary for any purpose to make the union of parts still stronger, it may be done by coating the tongues and grooves with thin paint, glue, or other cement.

In my invention shown in Letters Patent No. 161,746, dated April 5, 1875, there were one straight and one beveled side to the tongues and grooves In this invention the beveled side is divided by a shoulder or a re-entering line cutting the bevel near its center, preferably; but the re-entering line may start from the top on one side or both sides, so as to form a half or whole dovetail groove, as previously described.

I claim as my invention—

1. Compound lumber consisting of two or more layers of wood provided on their faces with coinciding ribs and grooves held together by locking-joints engaged by lateral pressure of the layers of wood.

2. The improvement in the art of attaching and securing the adjoining faces of layers of wood composing compound lumber, provided on their faces with coinciding tongues and grooves adapted to be held together by locking-joints, consisting in engaging the tongues and grooves by lateral insertion and compression in the act of insertion, as shown and described.

In testimony whereof I have signed my name to this specification in the presence of two subscribing witnesses.

WILLIAM E. BROCK.

Witnesses:
  GEORGE A. HAMMEL,
  EDWARD E. WOOLLEY.